United States Patent
Kim et al.

(10) Patent No.: US 12,503,949 B1
(45) Date of Patent: Dec. 23, 2025

(54) GAPPED ATTACHMENT FOR CERAMIC MATRIX COMPOSITE VANE AND METHOD

(71) Applicant: RTX CORPORATION, Farmington, CT (US)

(72) Inventors: Russell Kim, Temecula, CA (US); Howard J. Liles, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/955,440

(22) Filed: Nov. 21, 2024

(51) Int. Cl.
| | |
|---|---|
| *F01D 9/04* | (2006.01) |
| *B23P 15/00* | (2006.01) |
| *B23P 15/04* | (2006.01) |
| *F01D 5/28* | (2006.01) |
| *F01D 25/00* | (2006.01) |

(Continued)

(52) U.S. Cl.
CPC ............ *F01D 9/042* (2013.01); *B23P 15/008* (2013.01); *B23P 15/04* (2013.01); *F01D 25/005* (2013.01); *F01D 25/243* (2013.01); *F01D 25/246* (2013.01); *F01D 25/28* (2013.01); *F01D 5/282* (2013.01); *F01D 5/284* (2013.01); *F05D 2220/32* (2013.01); *F05D 2230/60* (2013.01); *F05D 2240/12* (2013.01); *F05D 2260/37* (2013.01); *F05D 2300/6033* (2013.01); *Y10T 29/49323* (2015.01); *Y10T 29/49336* (2015.01); *Y10T 29/49339* (2015.01)

(58) Field of Classification Search
CPC ........ F01D 5/282; F01D 5/284; F01D 25/005; F01D 9/042; F01D 25/246; F01D 25/243; F01D 25/28; F05D 2300/6033; F05D 2230/60; F05D 2260/37; B23P 15/02; B23P 15/04; B23P 15/008; B23P 2700/13; Y10T 29/49321; Y10T 29/49323; Y10T 29/49336; Y10T 29/49339
See application file for complete search history.

(56) References Cited

U.S. PATENT DOCUMENTS

| | | |
|---|---|---|
| 11,448,096 B2 | 9/2022 | Sobanski |
| 11,808,154 B2 | 11/2023 | Quach et al. |

(Continued)

FOREIGN PATENT DOCUMENTS

FR      3121707 A1 * 10/2022

OTHER PUBLICATIONS

English machine translation of FR-3121707-A1, Mar. 27, 2024.*

*Primary Examiner* — Christopher Verdier
(74) *Attorney, Agent, or Firm* — Christopher B. Kilner; Millen, White, Zelano & Branigan, P.C.

(57) ABSTRACT

An attachment assembly for a ceramic matrix composite (CMC) vane includes an inner diameter ring having a strut recess and a first flange on a downstream side configured for engaging an inner platform of the CMC vane, an outer diameter ring having a support structure disposed to form a gap relative to a portion of an outer platform of the CMC vane during a non-operating engine condition, and a strut cantilevered from an inner side of the outer diameter ring and disposed to pass through a hollow portion within an airfoil of the CMC vane to engage the strut recess in the inner diameter ring to support the inner diameter ring and the CMC vane. The inner and outer diameter rings and the strut may be metallic and carry the loads rather than the CMC carrying the loads.

13 Claims, 2 Drawing Sheets

(51) Int. Cl.
*F01D 25/24* (2006.01)
*F01D 25/28* (2006.01)

(56) References Cited

U.S. PATENT DOCUMENTS

| | | | |
|---|---|---|---|
| 2007/0154307 A1* | 7/2007 | Cairo | F01D 9/042 |
| | | | 415/209.3 |
| 2015/0003989 A1* | 1/2015 | Uskert | F01D 5/282 |
| | | | 416/220 R |
| 2017/0130608 A1* | 5/2017 | Wiebe | F01D 25/162 |
| 2024/0218801 A1 | 7/2024 | Gaillard et al. | |

* cited by examiner

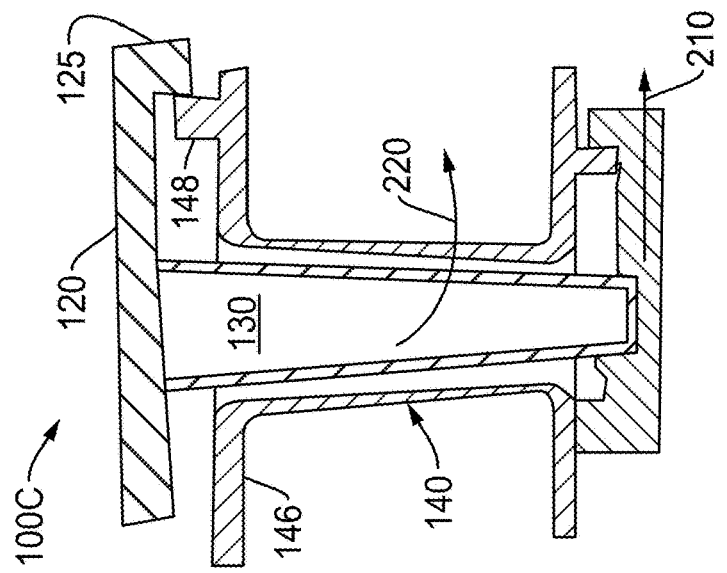
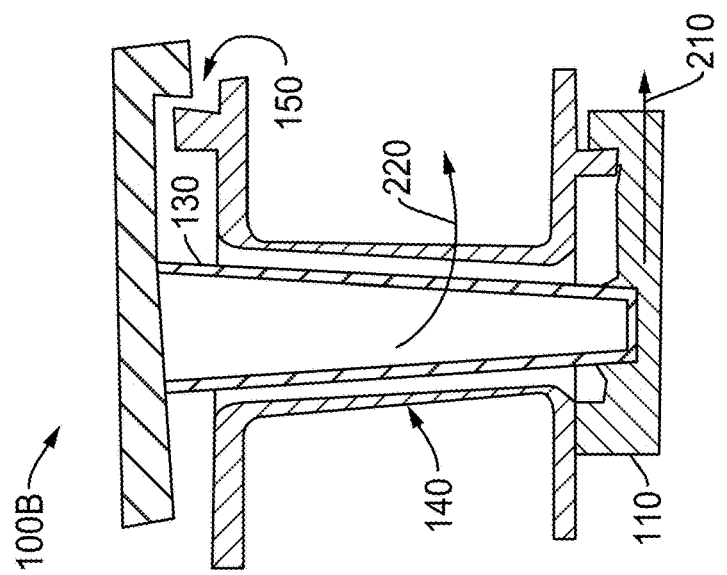
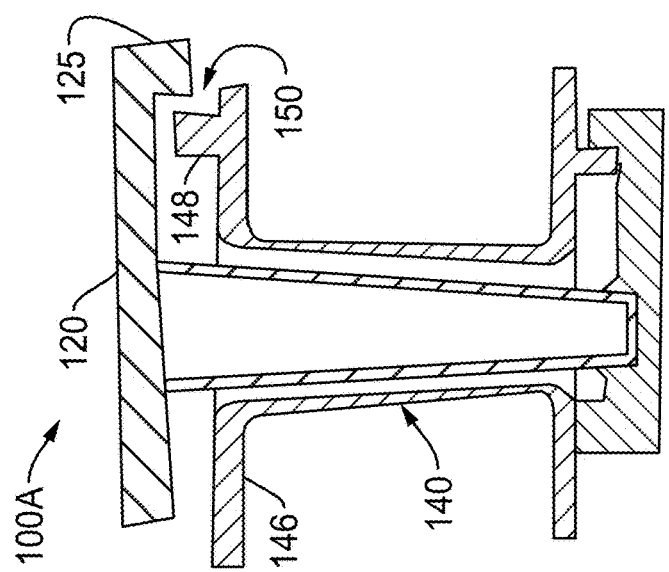

GAPPED ATTACHMENT FOR CERAMIC MATRIX COMPOSITE VANE AND METHOD

FIELD OF THE INVENTION

The subject matter disclosed herein relates to turbine vane supports and, in particular, to a gapped attachment for ceramic matrix composite (CMC) vanes and a method therefor.

BACKGROUND OF THE INVENTION

Turbine engines may use ceramic matric composite (CMC) vanes due to the high temperature capabilities of CMC material. For a ring strut ring assembly configuration, CMC vane components may use metallic hardware with direct contacts or may be designed to be free-floating and engage with surrounding hardware with direct contact. When such free-floating designs are used, the CMC vane components do not include direct connection with metallic hardware such as, but not limited to, pins and bolts, but rather directly contact surrounding hardware.

CMC vanes are subjected to high pressure loads, with high stresses being located around attachments.

The above information disclosed in this Background section is only for understanding of the background of the inventive concepts and, therefore, it may contain information that does not constitute prior art.

SUMMARY OF THE INVENTION

The present disclosure is directed, in a first aspect, to an attachment assembly for a ceramic matrix composite (CMC) vane. The attachment assembly includes an inner diameter ring having a strut recess and a first flange on a downstream side configured for engaging an inner platform of the CMC vane. The attachment assembly also includes an outer diameter ring having a support structure disposed to form a gap relative to a portion of an outer platform of the CMC vane during a non-operating engine condition, and a strut cantilevered from an inner side of the outer diameter ring and disposed to pass through a hollow portion within an airfoil of the CMC vane to engage the strut recess in the inner diameter ring to support the inner diameter ring and the CMC vane.

In an embodiment of the attachment assembly, during an intermediate engine condition, the inner diameter ring and CMC vane may be supported by the strut, and during a fully-engaged engine condition, the strut may be configured to flex to eliminate the gap and the outer platform of the CMC vane is further supported by the support structure of the outer diameter ring.

In another embodiment of the attachment assembly, the support structure may be a second flange disposed on a downstream side the outer diameter ring.

In a further embodiment of the attachment assembly, the upper platform may include an upper flange and the gap is formed relative to the upper flange.

In yet another embodiment of the attachment assembly, the strut may be detachable from the outer diameter ring.

In an embodiment of the attachment assembly, the strut may engage the strut recess in a friction fit.

In another embodiment of the attachment assembly, the strut may engage the strut recess in a slotted fit.

In a further embodiment of the attachment assembly, the strut may engage the strut recess with a pinned connection.

In yet another embodiment of the attachment assembly, the strut may be formed of high-temperature resistant metal alloy.

In an embodiment of the attachment assembly, the strut may be hollow.

The present disclosure is also directed, in a second aspect, to a metal alloy attachment assembly for a ceramic matrix composite (CMC) vane. The assembly includes an inner diameter ring formed of metal alloy having a strut recess and a first flange on a downstream side configured for engaging an inner platform of the CMC vane, an outer diameter ring formed of metal alloy and having a second flange disposed on a downstream side to form a gap relative to an upper flange of an outer platform of the CMC vane during a non-operating engine condition, and a hollow strut formed of metal alloy that is cantilevered from an inner side of the outer diameter ring and disposed to pass through a hollow portion within an airfoil of the CMC vane to engage the strut recess in the inner diameter ring to support the inner diameter ring and the CMC vane. During an intermediate engine condition, the inner diameter ring and CMC vane are supported by the hollow strut, and during a fully-engaged engine condition, the hollow strut is configured to flex to eliminate the gap and the outer platform of the CMC vane is further supported by the second flange of the outer diameter ring.

In an embodiment of this attachment assembly, the hollow strut may also be detachable from the outer diameter ring.

In another embodiment of this attachment assembly, the hollow strut may engage the strut recess with a connection selected from a friction fit, a slotted fit, and a pinned connection.

The present disclosure is further directed, in a third aspect, to a method for supporting a ceramic matrix composite (CMC) vane of a turbine engine with metal alloy attachment components. The method includes, in any suitable order: cantilevering a proximal end of a metal alloy strut from an outer diameter ring formed of a metal alloy; passing the metal alloy strut through a hollow airfoil of the CMC vane; securing a distal end of the metal alloy strut within a strut recess of an inner diameter ring formed of a metal alloy; engaging an inner platform of the CMC vane with a first flange disposed on a downstream side of the inner diameter ring; and forming a gap between a second flange disposed on a downstream side of the outer diameter ring and a support portion of an upper platform of the CMC vane during a non-operating engine condition.

In an embodiment, the method may further include supporting the inner diameter ring and the CMC vane with the metal alloy strut during an intermediate engine condition.

In another embodiment, the method may further include flexing the metal alloy strut in response to a fully-engaged engine condition to close the gap and further support the outer platform the CMC vane with the second flange of the outer diameter ring.

In a further embodiment of the method, cantilevering the proximal end of the metal alloy strut from the outer diameter ring may include attaching the proximal end of the metal alloy strut to the outer diameter ring with a fastener.

In yet another embodiment of the method, securing the distal end of the metal alloy strut within the strut recess of the inner diameter ring may include attaching the distal end of the metal alloy strut to the strut recess with a friction fit.

In an embodiment of the method, securing the distal end of the metal alloy strut within the strut recess of the inner diameter ring may include attaching the distal end of the metal alloy strut to the strut recess with a slotted fit.

In another embodiment of the method, securing the distal end of the metal alloy strut within the strut recess of the inner diameter ring may include attaching the distal end of the metal alloy strut to the strut recess with a pinned connection.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

FIG. 2A is a schematic cross-section of the example CMC vane and attachment assembly using the gapped attachment in accordance with the present disclosure in a non-operating engine condition;

FIG. 2B is a schematic cross-section of the example CMC vane and attachment assembly using the gapped attachment in accordance with the present disclosure in an intermediate engine condition; and FIG. 2C is a schematic cross-section of the example CMC vane and attachment assembly using a gapped attachment in accordance with the present disclosure with the gap closed in a fully engaged engine condition.

DETAILED DESCRIPTION OF THE INVENTION

Figure 1:
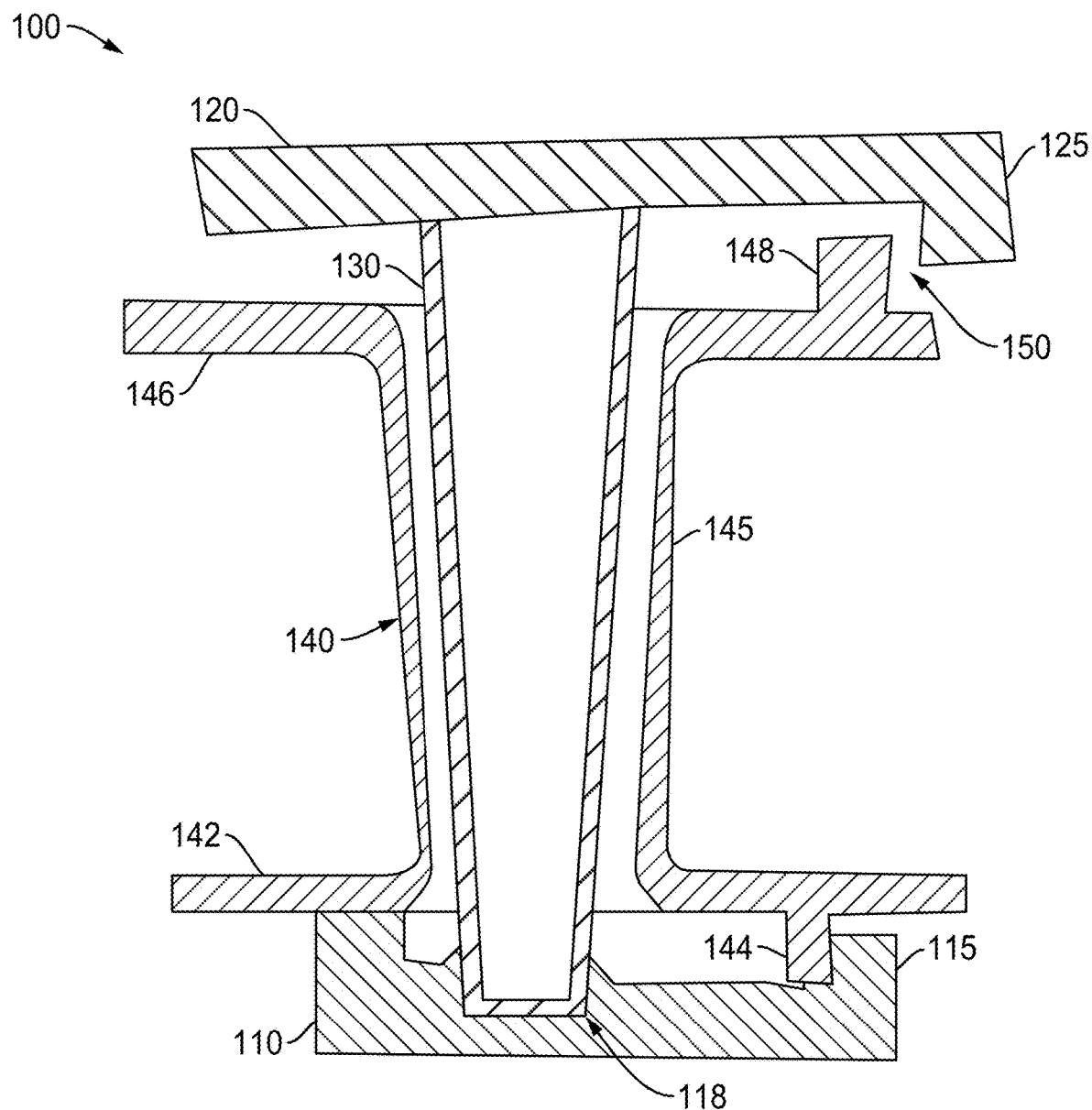
FIG. 1 is a schematic cross-section of an example CMC vane and attachment assembly using a gapped attachment in accordance with the present disclosure.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an," and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior."

It will further be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

The present disclosure is directed to a gapped attachment for ceramic matrix composite (CMC) vanes and a method therefor. The configuration of the attachment within a ring strut ring assembly permits a gap between the CMC vane and the metallic attachment hardware when the turbine engine is not operating, with the CMC vane and metallic attachment hardware gradually engaging during operation of the turbine engine. During the transition to fully engaging, the strut within the ring strut ring assembly will translate most of the load to the outer diameter ring when the CMC vane is not fully engaged.

Referring to FIG. 1, an attachment assembly 100 for a ceramic matrix composite (CMC) vane 140 is illustrated. FIG. 1 is a generally schematic view of an example embodiment, and embodiments within the present disclosure may take other forms.

Attachment assembly 100 includes an inner diameter ring 110 having a strut recess 118 and a first flange 115 on a downstream side, wherein the downstream side corresponds to the side having the trailing edge of an airfoil 145 of the CMC vane 140. The first flange 115 is configured for engaging an inner platform 142 of the CMC vane 140, and may, for example engage a lower flange 144 extending from the main portion of lower platform 142. The inner diameter ring 110 may be formed from a metal alloy, such as a corrosion and heat-resistant Nickel alloy, including but not limited to AMS 5879, AMS 5914, AMS 5950, AMS 5704-5709, AMS 5715, AMS 5754, AMS 5798, and the like, or may be made from other corrosion and heat-resistant material such as CMC.

Attachment assembly 100 also includes an outer diameter ring 120 having a support structure 125 disposed to define or form a gap 150 relative to a portion 148 of an outer platform 146 of the CMC vane 140 during a non-operating engine condition. In the illustrated embodiment, the support portion 125 is a second flange 125 on the downstream side of outer diameter ring 120 and the portion 148 that defines gap 150 is a flange 148 extending from the outer platform 146. However, support structure 125 and portion 148 defining the gap 150 may take other forms and can be, but are not limited to flanges and anti-rotation features configured to counteract the axial and turning moment forces on CMC vane 140 during turbine engine operation. The outer diameter ring 120 may be formed from a metal alloy, such as a corrosion and heat-resistant Nickel alloy, including but not limited to AMS 5879, AMS 5914, AMS 5950, AMS 5704-5709, AMS 5715, AMS 5754, AMS 5798, and the like, or may be made from other corrosion and heat-resistant material such as CMC.

The attachment assembly 100 further includes a strut 130 cantilevered from an inner side of the outer diameter ring 120 and disposed to pass through a hollow portion within the airfoil 145 of the CMC vane 140 to engage the strut recess 118 in the inner diameter ring 110 to support the inner diameter ring 110 and the CMC vane 140. The strut 130 may be detachable from the outer diameter ring 120. For example, the strut 130 may be attached to the outer diameter ring 120 using fasteners in order to facilitate assembly and disassembly of the vane attachment. The strut 130 may be hollow and tapered to keep weight down and tune its flexing characteristics. The strut 130 may be formed from a metal alloy, such as corrosion and heat-resistant Nickel alloy, including but not limited to AMS 5879, AMS 5914, AMS 5950, AMS 5704-5709, AMS 5715, AMS 5754, AMS 5798, and the like, or may be made from other corrosion and heat-resistant material such as CMC. Typically, the strut 130 should be dimensioned so as to not contact the inner walls of the airfoil 145 when it is positioned within a hollow portion of the airfoil 145 and secured to the inner diameter ring 110.

In various embodiments, the strut 130 may engage the strut recess 118 in any suitable manner, such as a friction fit (shown), a slotted fit (not shown), or a pinned connection (not shown).

As discussed above and illustrated again in FIG. 2A, which shows an example of attachment assembly 100A in a non-operating engine condition, a gap 150 will be defined between support structure 125 of the outer diameter ring 120 (e.g., second flange 125) and portion 148 (e.g., an upper flange 148) of the upper platform 146 of CMC vane 140.

As illustrated in FIG. 2B, which shows an example of attachment assembly 100B in an intermediate engine condition, the inner diameter ring 110 and CMC vane 140 will be supported by the strut 130 during this intermediate engine condition. While the strut 130 may begin to flex due to carrying the loads of axial load 210 and turning moment 220, the gap 150 may prevent these loads from being carried by the CMC vane 140.

As illustrated in FIG. 2C, which shows an example of attachment assembly 100C in a fully-engaged engine condition, the strut 130 is configured to flex under loading to eliminate the gap 150 during this fully-engaged engine condition. Consequently, the outer platform 146 of the CMC vane 140 is further supported by the support structure 125 of the outer diameter ring 120 (e.g., the second flange 125 disposed on a downstream side of the outer diameter ring 120) so as to transfer some of the loads of axial load 210 and turning moment 220 to the CMC vane 140.

Thus, as the inner diameter ring 110 moves backward under increased loading, the CMC vane 120 does not carry any of the load until the attachment assembly 100C is in the fully-engaged engine condition of FIG. 2C. Accordingly, the metallic hardware of the inner diameter ring 110, the outer diameter ring 120, and the strut 130 takes up more of the load so as to increase the durability of the CMC vane 130. Additionally, the metallic hardware can potentially handle higher loads than CMC material, have greater durability than CMC materials, be easier to fabricate than CMC materials, and be more cost effective (e.g., cheaper) than CMC materials.

With reference to FIGS. 1, 2A, 2B, and 2C, one or more embodiments of the present disclosure may be to a metal alloy attachment assembly 100 for a CMC vane 140 that includes an inner diameter ring 110 formed of metal alloy having a strut recess 118 and a first flange 115 on a downstream side configured for engaging an inner platform 142 of the CMC vane 140. The embodiments also include an outer diameter ring 120 formed of metal alloy and having a second flange 125 disposed on a downstream side to form a gap 150 relative to an upper flange 148 of an outer platform 146 of the CMC vane 140 during a non-operating engine condition (see FIG. 2A). The embodiments further include a hollow strut 130 formed of metal alloy that is cantilevered from an inner side of the outer diameter ring 120 and disposed to pass through a hollow portion within an airfoil 145 of the CMC vane 140 to engage the strut recess 118 in the inner diameter ring 110 to support the inner diameter ring 110 and the CMC vane 140. In these embodiments, during an intermediate engine condition (see FIG. 2B), the inner diameter ring 110 and CMC vane 140 are supported by the hollow strut 130, and during a fully-engaged engine condition (see FIG. 2C), the hollow strut 130 is configured to flex to eliminate the gap 150 and the outer platform 146 of the CMC vane 140 is further supported by the second flange 125 of the outer diameter ring 120.

In variations of these embodiments, the hollow strut 130 may be detachable from the outer diameter ring 120, and the hollow strut 130 may engage the strut recess 118 with a connection selected, for example, from a friction fit, a slotted fit, and a pinned connection.

With further reference to FIGS. 1, 2A, 2B, and 2C, one or more embodiments of the present disclosure may be to a method for supporting a CMC vane 140 of a turbine engine with metal alloy attachment components. The method may include, in any suitable order: cantilevering a proximal end of a metal alloy strut 130 from an outer diameter ring 120 formed of a metal alloy; passing the metal alloy strut 130 through a hollow airfoil 145 of the CMC vane 140; securing a distal end of the metal alloy strut 130 within a strut recess 118 of an inner diameter ring 110 formed of a metal alloy; engaging an inner platform 142 of the CMC vane 140 with a first flange 115 disposed on a downstream side of the inner diameter ring 110; and forming a gap 150 between a second flange 125 disposed on a downstream side of the outer diameter ring 120 and a support portion 148 of an upper platform 146 of the CMC vane 140 during a non-operating engine condition, as shown in FIG. 2A.

The method may further include supporting the inner diameter ring 110 and the CMC vane 140 with the metal alloy strut 130 during an intermediate engine condition, as shown in FIG. 2B.

The method may also include flexing the metal alloy strut 130 in response to a fully-engaged engine condition (see FIG. 2C) to close the gap 150 and further support the outer platform 146 the CMC vane 140 with the second flange 125 of the outer diameter ring 120.

In one or more embodiments of the method, the cantilevering of the proximal end of the metal alloy strut 130 from the outer diameter ring 120 may include attaching the proximal end of the metal alloy strut 130 to the outer diameter ring 120 with a fastener (not shown).

Additionally, in one or more embodiments of the method, the securing of the distal end of the metal alloy strut 130 within the strut recess 118 of the inner diameter ring 110 may include attaching the distal end of the metal alloy strut to the strut recess with a friction fit, a slotted fit, or a pinned connection.

The attachment assembly and associated methods in accordance with the present disclosure have multiple benefits. Indeed, in accordance with the present disclosure, a lower load may be distributed through the CMC material of CMC vane since the outer diameter ring and the cantilevered strut will take on additional loading. The attachment assembly and associated methods in accordance with the present disclosure may also reduce CMC attachment stresses and improve durability of the CMC vane. Further, the delay in engagement of certain attachments may improve stability and reduce leakages due to the limited compliance of the CMC vane. And finally, the metallic hardware of the attachment assembly in accordance with the present disclosure may be leveraged to accommodate for additional loads.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. An attachment assembly for a ceramic matrix composite (CMC) vane, comprising:
    an inner diameter ring having a strut recess and a first flange on a downstream side configured for engaging an inner platform of the CMC vane;
    an outer diameter ring having a support structure disposed to form a gap relative to a portion of an outer platform of the CMC vane during a non-operating engine condition; and
    a strut cantilevered from an inner side of the outer diameter ring and disposed to pass through a hollow portion within an airfoil of the CMC vane to engage the strut recess in the inner diameter ring to support the inner diameter ring and the CMC vane; wherein:
    during an intermediate engine condition, the inner diameter ring and CMC vane are supported by the strut, and
    during a fully-engaged engine condition, the strut is configured to flex to eliminate the gap and the outer platform of the CMC vane is further supported by the support structure of the outer diameter ring.

2. The attachment assembly of claim 1, wherein the support structure is a second flange disposed on a downstream side of the outer diameter ring.

3. The attachment assembly of claim 1, wherein the upper platform includes an upper flange and the gap is formed relative to the upper flange.

4. The attachment assembly of claim 1, wherein the strut is detachable from the outer diameter ring.

5. The attachment assembly of claim 1, wherein the strut engages the strut recess in a friction fit.

6. The attachment assembly of claim 1, wherein the strut is formed of high-temperature resistant metal alloy.

7. The attachment assembly of claim 1, wherein the strut is hollow.

8. The attachment assembly of claim 1, wherein the hollow strut engages the strut recess with a friction fit.

9. A metal alloy attachment assembly for a ceramic matrix composite (CMC) vane, comprising:
    an inner diameter ring formed of metal alloy having a strut recess and a first flange on a downstream side configured for engaging an inner platform of the CMC vane;
    an outer diameter ring formed of metal alloy and having a second flange disposed on a downstream side to form a gap relative to an upper flange of an outer platform of the CMC vane during a non-operating engine condition; and
    a hollow strut formed of metal alloy that is cantilevered from an inner side of the outer diameter ring and disposed to pass through a hollow portion within an airfoil of the CMC vane to engage the strut recess in the inner diameter ring to support the inner diameter ring and the CMC vane, wherein:
    during an intermediate engine condition, the inner diameter ring and CMC vane are supported by the hollow strut, and
    during a fully-engaged engine condition, the hollow strut is configured to flex to eliminate the gap and the outer platform of the CMC vane is further supported by the second flange of the outer diameter ring.

10. The attachment assembly of claim 9, wherein the hollow strut is detachable from the outer diameter ring.

11. A method for supporting a ceramic matrix composite (CMC) vane of a turbine engine with metal alloy attachment components, comprising:
    in any suitable order:
    cantilevering a proximal end of a metal alloy strut from an outer diameter ring formed of a metal alloy;
    passing the metal alloy strut through a hollow airfoil of the CMC vane;
    securing a distal end of the metal alloy strut within a strut recess of an inner diameter ring formed of a metal alloy;
    engaging an inner platform of the CMC vane with a first flange disposed on a downstream side of the inner diameter ring;
    forming a gap between a second flange disposed on a downstream side of the outer diameter ring and a support portion of an upper platform of the CMC vane during a non-operating engine condition;
    supporting the inner diameter ring and the CMC vane with the metal alloy strut during an intermediate engine condition; and
    flexing the metal alloy strut in response to a fully-engaged engine condition to close the gap between the second flange and the support portion and further axially support the support portion of the outer platform of the CMC vane with the second flange of the outer diameter ring.

12. The method of claim 1, wherein cantilevering the proximal end of the metal alloy strut from the outer diameter ring includes attaching the proximal end of the metal alloy strut to the outer diameter ring.

13. The method of claim 11, wherein securing the distal end of the metal alloy strut within the strut recess of the inner diameter ring includes attaching the distal end of the metal alloy strut to the strut recess with a friction fit.

\* \* \* \* \*